United States Patent [19]

Munsey et al.

[11] Patent Number: 4,747,018

[45] Date of Patent: May 24, 1988

[54] CARRIER FOR ELECTRONIC CIRCUIT BOARDS

[75] Inventors: David M. Munsey, Bridgton; David H. Dowler, Raymond, both of Me.

[73] Assignee: GTE Products Corporation, Stamford, Conn.

[21] Appl. No.: 2,587

[22] Filed: Mar. 6, 1987

[51] Int. Cl.⁴ .......................... H05K 1/02; H05K 5/00
[52] U.S. Cl. ..................................... 361/399; 206/449;
    361/415; 361/426; 379/332; 439/709
[58] Field of Search .................. 439/709, 719, 723;
    379/326, 327, 330, 331, 332; 361/415, 426, 395,
    399, 346, 358, 427, 428, 417, 419, 412, 424;
    174/59; 211/41; 206/328, 449, 456

[56] References Cited

U.S. PATENT DOCUMENTS

| 3,777,223 | 12/1973 | Chandler | 361/426 |
| 4,176,751 | 12/1979 | Gillissie | 206/328 |
| 4,334,261 | 6/1982 | Gonzales | 361/415 |
| 4,403,106 | 9/1983 | Lask | 361/428 |
| 4,516,189 | 5/1985 | Seaks, Jr. | 361/426 |
| 4,591,950 | 5/1986 | Houpt | 361/426 |
| 4,635,791 | 1/1987 | Jackson | 206/456 |
| 4,694,380 | 9/1987 | Mallory | 361/415 |

Primary Examiner—G. P. Tolin
Attorney, Agent, or Firm—James Theodosopoulos

[57] ABSTRACT

A carrier for electronic circuit boards that is configured for placement in a case of a telephone interface device. The carrier includes a backing member and at least two channels disposed at opposite ends thereof. A flange extends from each end of the backing member, whereby the carrier can be placed in the case of the interface device.

10 Claims, 4 Drawing Sheets

CARRIER FOR ELECTRONIC CIRCUIT BOARDS

FIELD OF THE INVENTION

The present invention relates to carriers for electronic circuit boards and particularly to carriers that are adapted and arranged to be removably disposed within the cases that house plug and jack assemblies of telephone network interface devices.

BACKGROUND OF THE INVENTION

With the advent of deregulation of the telephone industry and the ownership of telephone equipment by subscribers to telephone service, a need has arisen to define a point of demarcation between the portion of the telephone network owned by the subscriber and the portion which is owned by the telephone company. This need has been met through the use of a telephone network interface device that is disposed adjacent to the subscriber's home or place of business.

In one form, an interface device can include a first set of terminal posts that receives wires from the central office of the telephone company and a second set that receives wires from the subscriber's home or place of business. These two sets of posts are linked together with equipment such as a standard RJ-11C modular plug and jack assembly (which can also have one of the sets of posts disposed on it). The plug and jack assembly establishes an interface between the subscriber's portion of the telephone system and the portion that belongs to the company. The equipment, such as the RJ-11C jack and plug assembly, and the associated terminal posts, are convenient for the subscriber to use and easy for the telephone company to install and maintain. All of this equipment is mounted inside of a molded plastic case or housing that is installed at the subscriber's site.

The use of the telephone interface devices in the telephone system has provided an opportunity for the telephone companies to install electronic circuit boards that are necessary for the maintenance and testing of the telephone equipment. These circuit boards can be installed in the case or housing in which the plug and jack assemblies are disposed. For example, circuit boards with testing circuits such as the so-called half ringer circuit or equivalent (which allows a telephone company to test the integrity of its wires and circuits without visiting the subscriber's location) can be disposed in the case that holds the telephone interface device.

The boards that are used for such circuits contain the usual array of wires, resistors, transistors and other electronic components. Because of improvements and modifications that are made to the circuits, the size and shape of the circuit boards may change from time to time, typically becoming smaller as they are improved or simplified.

Thus, since the size and shape of the circuit boards may change from time to time, it is necessary to provide for an accommodation of these future changes without having to make modifications in the shape and size of the molded plastic case itself. Since the molded plastic case is affixed to a building or other similar type of support, it is quite undesirable to have to change the entire case that houses the interface device merely because a circuit board that has to be mounted in it has been changed in size from that which was in use when the case was molded.

We have discovered that through the use of the carrier of the present invention, circuit boards of many different sizes and shapes can be accommodated in the case for the telephone network interface device without making changes in the size and shape of the molded case. The circuit board carrier that we have discovered eliminates the need for costly modifications to the mold that is used in the process of making the case for the interface device. Relatively inexpensive carriers can be made easily to accommodate changes in the size and shape of the circuit boards that will be placed into the case of the telephone interface device over the years. The carrier can be molded from the same plastic, if desired, as the case into which it will be fitted.

Moreover, in many cases, it is highly desirable to use the carrier of the present invention not only for receiving the circuit boards, but also as an integral part of the interface device itself, in that we have discovered the carrier can serve as a support to provide wiring locations for circuit boards that are in use within the case. For example, the carrier of the present invention can have pre-formed fittings for threaded fasteners which can serve as electrical posts in the interface device, thereby providing not only a carrier for the circuit board, but also an interactive terminal in the telephone system. This feature can be provided without losing enclosure space or making costly modifications to the mold as the size and shape of the circuit boards varies from time to time.

SUMMARY OF THE INVENTION

The holder for electronic circuit boards of the present invention includes a backing member that is adapted to be disposed between a pair of end members, the latter being disposed generally normal to the backing member. The end members are formed with retainer members disposed at the ends thereof (generally normal to the end members) so as to form channels that oppose each other in a face-to-face relation. A bottom wall connects the end members and the retainer members and together with the backing member forms a pocket for the disposition of a circuit board. A flange is disposed on each end of the backing member, the flanges being arranged (in the preferred embodiment) on the same plane as the backing member, and such that the carrier can be disposed in slots formed in a compartment in the case of the telephone interface device.

To provide for easy storage and removal of the circuit board holder, we can provide a handle, preferably in the form of a tab, that extends from the top edge of the backing member. From time to time it may be important to wire the circuit board that is stored in the holder into the associated telephone network. We have found that hollow pillars can be disposed between the backing member and the flanges to accomplish this purpose. These pillars can receive threaded fasteners which can serve as wiring connections within the telephone network.

In one embodiment, there are at least two (and preferably four) hollow pillars, each of which (or preferably each two of which) are on each end of said backing member. In the case when two or more pillars are joined to each other, a separator is disposed between the pillars to electrically insulate the electrically conductive components from each other. In a further embodiment, the disposition of the pillars can be staggered, that is aligned (relative to the backing member) at an angle between about 90° and 180°, whereby the distance between the channels can be extended and larger circuit boards can be disposed in the carrier. In this way, less space is required for the disposition of the pillars thereby allowing wider pockets.

In another aspect of this invention, we have found that our carrier can accommodate two pockets, each pocket being disposed on an opposite side of the backing member. These pockets are disposed in a back to back relationship, whereby two circuit boards can be stored on a single circuit board holder.

DESCRIPTION OF THE PREFERRED EMBODIMENTS

Figure 1:
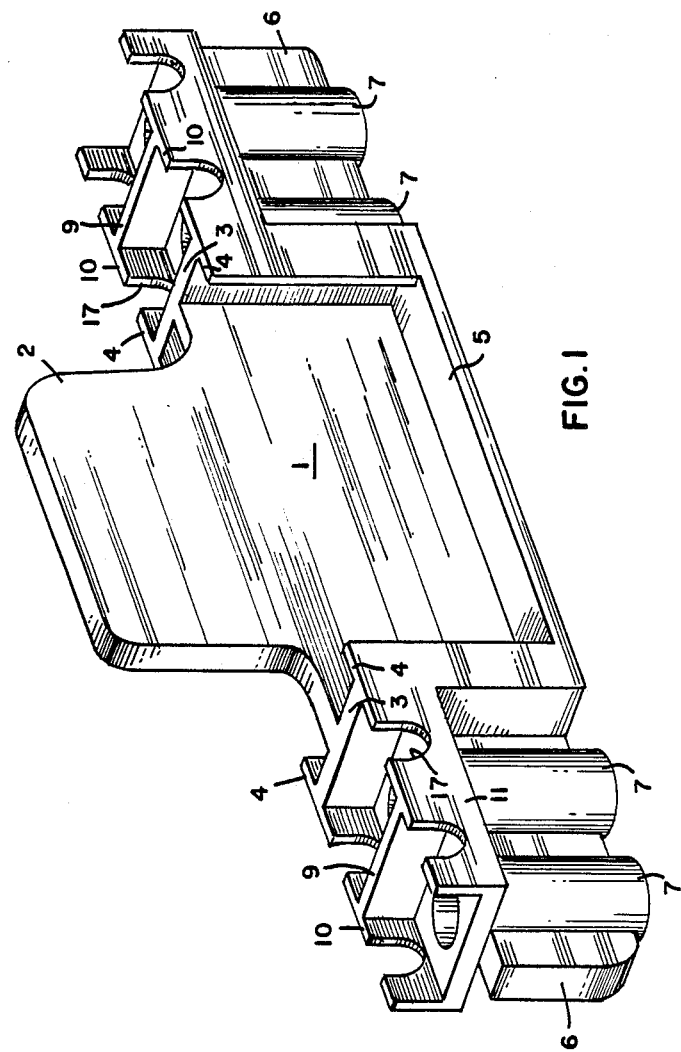
FIG. 1 is a perspective view of the circuit board holder for electronic circuit boards according to the present invention.

Referring now to FIG. 1, the circuit board holder according to the present invention includes a backing member 1 with a handle 2 disposed upon the upper edge thereof. An end member 3 is disposed at each end of the backing member 1, preferably configured so as to be normal thereto. A retainer 4 is disposed at each of the ends of the end members 3, the retainers 4 preferably being normal to the end members 3. The backing member 1, together with the end members 3 disposed at each end thereof, and the retainers 4 which are disposed at the ends of the end members 3, cooperate to form opposing channels. The backing member 1, the end members 3 and the retainer 4 are joined together at their lower ends with a bottom wall 5 to form a pocket.

A flange 6 is disposed at either end of the circuit board holder and is arranged to slide into slots in the case that houses the telephone network interface device (not shown in this drawing). The flange 6 may be separated from the end members 3 by one or more pillars 7. The pillars 7 are hollow members adapted to receive threaded fasteners which can be screwed therein. The threaded fasteners can be separated from each other by means of separators walls 9 and side walls 10 which prevent electrical contact from occurring between the wires attached to threaded fasteners. Cavities 17 can be disposed in side walls 10 to aid in the attachment of the wires.

A preferred embodiment of the present invention provides for placing a pocket on each side of the backing member 1. Such duplication allows for the disposition of circuit boards on each side of a single carrier. Preferably, in this embodiment, end members 3 are extended an equal distance on both sides of backing member 3, whereby the pockets can be formed of identical size and shape.

Figure 2:
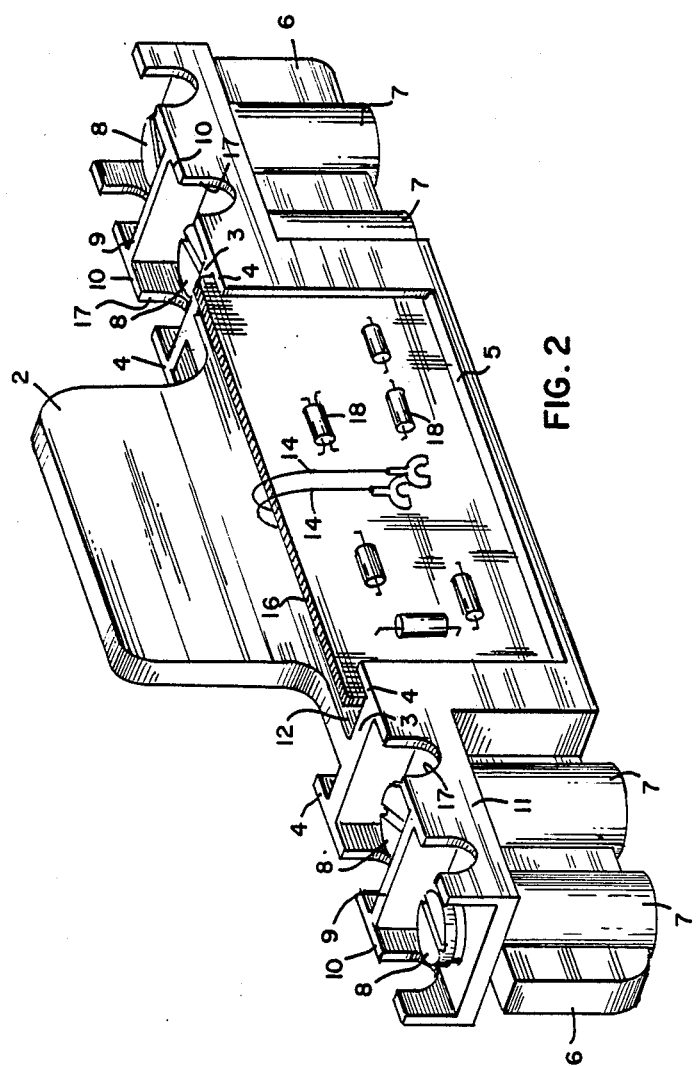
FIG. 2 is a perspective view of the holder with a circuit board housed in it.

In FIG. 2, a circuit board holder is shown that is identical to the holder shown in FIG. 1. A circuit board 16 is disposed in the pocket configured as described previously. The circuit board 16 that is disposed in the pocket is of a size and shape such that it easily fits in the channels, whereby to be used, as desired, for integration into the telephone network. The usual array of electronic components 18 are disposed upon the board 16 and lead-in wires 14 extend from it. Wires 14 can be extended around the separator walls 3 and end walls 10 and threaded through slots 17, whereby they can be fitted beneath the heads of threaded fasteners 8. Threaded fasteners 8 serve as terminal ends and can receive lead-in wires (not shown) from the telephone interface device into which the circuit board holder will be fitted.

Figure 3:
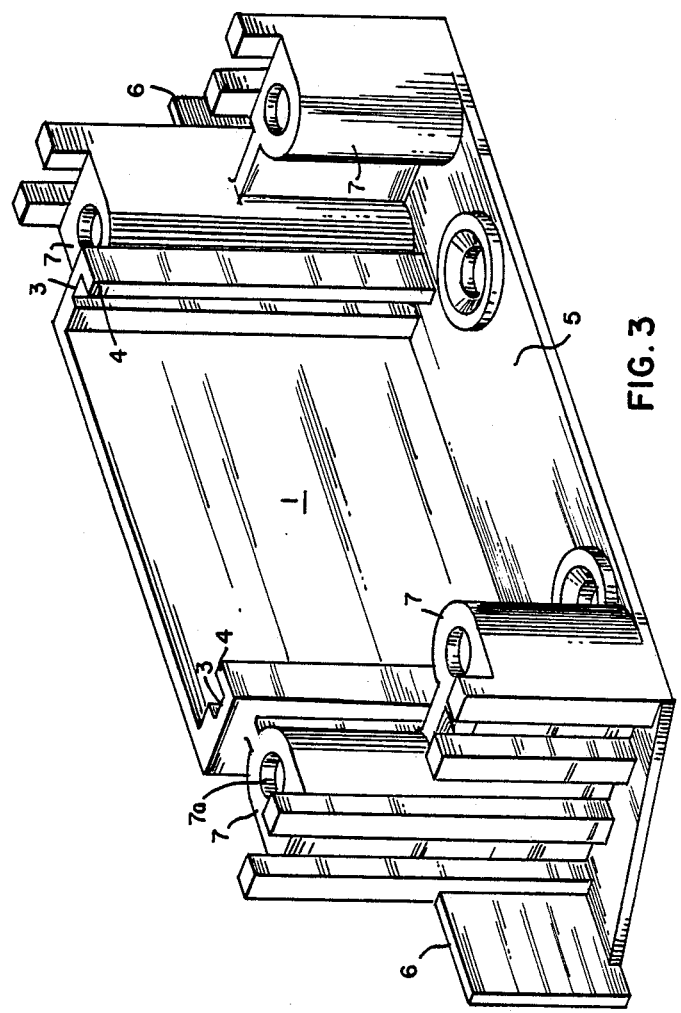
FIG. 3 is a perspective view of another embodiment of the holder of the present invention.
Figure 4:
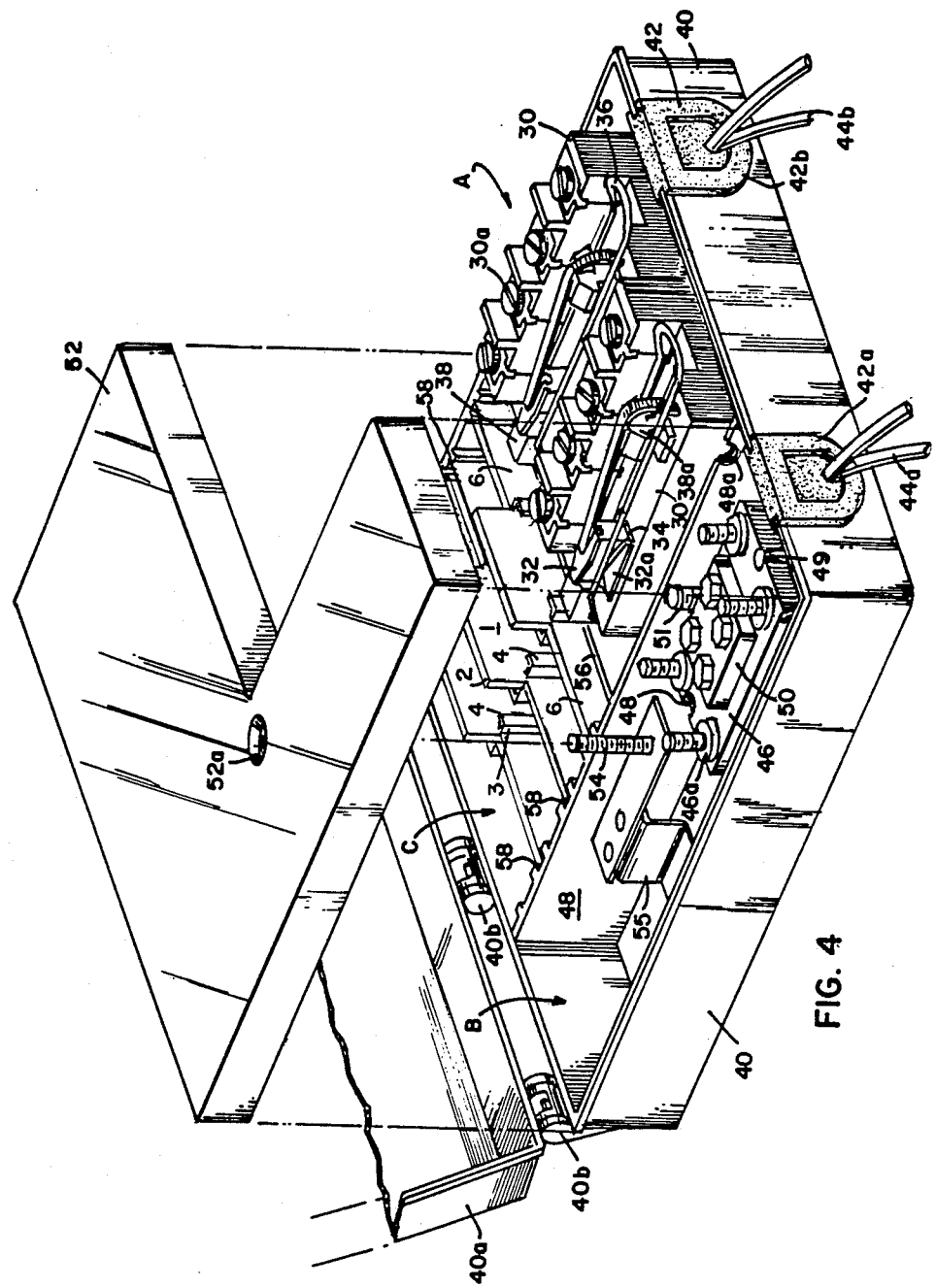
FIG. 4 is a perspective view of a case and a cover that can be used to hold a telephone network interface device, associated wiring and the circuit board carrier of the present invention. The case is an internally compartmented structure that is arranged so that limited access is provided to the compartments, that is, some of the compartments are covered and at least one is not.

In FIG. 3, another embodiment of the carrier of the present invention is shown. The versatility of the carrier is illustrated in that circuit boards can be mounted which are wider then those that can be housed in the circuit board holder of FIG. 1. Conversely, other boards can be stored in a narrower size case than that which is shown in FIG. 4. The pillars 7 are disposed in a face-to-face relationship to each other (as distinguished from a side-by-side relation) thereby to enable the circuit board holder to be stowed in the same case as the holder shown in FIG. 1. As can be seen, the end members 3 and retainers 4 are configured in a manner similar to that shown in FIG. 1 whereby opposing channels are formed. When the bottom wall 5 is considered, similar pockets are formed. The length of the pocket can be considerably longer, however, because of the disposition of the pillars 7. The distance between the ends of flanges 6 of the embodiment shown in FIG. 3, however, is the same as the embodiment shown in FIG. 1, thereby allowing larger circuit boards to be stowed in the same compartment of the case for the network interface device.

Turning now to FIG. 4, a telephone network interface device is shown, together with a case that encloses the device and associated wiring. A pair of RJ-11C plug and jack assemblies 30 are shown, such as disclosed in the co-pending application filed by Mickelson et al, Ser. No. 683,739 dated Dec. 19, 1984 and assigned to the same assignee as the present invention. They each include a modular plug 32 and a jack 34 (beneath the plug 32) into which the plug 32 fits. The plug 32 has metal contacts for making electrical contact with matching electrical contacts in the jack 34. A mating surface is disposed on the plug 32 which mates with a corresponding matching surface on the jack 34. The jack 34 and plug 32 are maintained in compression by spring retainer clip 36 which is pivotably mounted in holder 38 and engages a cam surface 32a on plug 32 and snaps onto retainer 38a to ensure that the plug is detachably held in place. In the embodiment shown in the drawing, two identical RJ-11C assemblies are shown, disposed side by side.

The plug and jack assemblies 30 are disposed in a compartment A of a case 40. Compartment A is exposed in that it, and its contents, can be seen and worked upon when the cover 40a is swung open on hinges 40b. Wires leading into and out of case 40 are fitted through flexible watertight rubber or plastic retainers 42a and 42b that are disposed in the sidewalls of case 40.

Wires 44a entering into the equipment pass through the sidewalls of the case 40 and are split to attach to posts 46a on terminal block 46 from whence they are connected to the posts on plug and jack assemblies 30 by means of the threaded fasteners 30a. The wiring between the posts 46a and the plug and jack assemblies 30 is not shown, but passes over recess 48a which provides for a bridge between the compartments. Terminal block 46 is disposed in compartment B of the case 40. Wires 44b, leading to the customer's telephones, emerge through retainer 42b. Compartment B is separated from the other compartments (A and C of the housing) by midwall 48 that extends from one sidewall of the case 40 to the other. The size of compartment B is sufficient to hold the terminal block 46 and electrically insulate it from the other compartments in the case 40.

In the preferred embodiment, terminal block 46 is attached to the case 40 by means of threaded fasteners (not shown) that are received in recesses 49 which engage a molded screw fitting (not shown). A metal plate 50 is bolted to the top of the terminal block 46 by means of bolts 50a. Plate 50 is electrically separated from a bolt 51 that is disposed on the side of terminal block 46. Bolt 51 is connected to an electrical ground. We have found that the separation between bolt 51 and plate 50 (and bolts 50a and the plug and jack 30) can be such that if a line voltage surge should occur due to lightning, for example, an arc will occur, thereby protecting the telephone equipment on the customer's side of the telephone network interface device. The compartment B is covered by a inner protective cover 52 that is detachably held in place by threaded fastener 54. Threaded fastener 54 is attached to case 40 by means of a bracket 55. A nut (not shown) is disposed in a recess 52a. Recess 52a is designed so that the nut cannot be conveniently removed by a customer, but can be readily unscrewed by a telephone repair person with the proper tools.

When the cover 52 is removed by the telephone company employee, compartment B is readily available for service, as is compartment C. Compartment C is formed by a second midwall 56 that extends between first midwall 48 and the side wall of the case 40. Inner cover 52 is disposed over compartment C also, so as to inhibit people other than telephone company employees from accessing it.

A series of opposing channels 58 are disposed on one of the sidewalls of the case 40 and on midwall 48. These channels 58 face each other and are arranged to receive the circuit board holders, such as shown in FIGS. 1 and 3 of this application. As can be seen, the distance between the channels 58 is fixed, thereby limiting the length of a holder that can be fitted therebetween. Since the case is usually mounted in a location for a prolonged period of time, and since the sizes and shapes of the circuit boards that are disposed within compartment C can vary from time to time, the circuit board holder can be readily changed to receive such changes without placing a new case in service. The circuit board holder is relatively inexpensive, that is relative to the cost of installing a new case or procuring a new mold to make new cases which will accommodate smaller or differently shaped circuit boards.

With the inner cover removed, the terminals and the circuit boards that are disposed therein can be easily changed. Also, if it is desired to wire the circuit boards that are disposed on the holders into the telephone interface devices, the wires can be easily bridged over midwall 56 to the threaded fasteners 30a.

It is apparent that modifications and changes can be made within the spirit and scope of the present invention, but it is our intention only to be limited by the scope of the appended claims.

As our invention we claim:

1. A holder for electronic circuit boards, said holder being adapted to be disposed in a telephone network interface device, said holder comprising:
   a backing member adapted to serve as a central support for said holder, said backing member having two ends and a face portion, said face portion serving as the front of said holder; and
   a pair of channel members disposed on the face portion of said backing member, the interiors of said channel members being spaced from and opposing each other in a face to face relation; and
   bottom wall means connecting said channel members and said backing member, whereby pocket means for the disposition of a circuit board is, formed and a circuit disposed in said pocket means;
   laterally extending flange means disposed on each of said two ends of said backing member, said flange means allowing said holder to be disposed in slots in said telephone network interface device.

2. The holder according to claim 1 wherein each of the channel members are formed of an end member disposed on said backing member and a retainer disposed on each of said end members, said end members being disposed substantially normal to the backing member and the retainer being disposed substantially normal to the end members.

3. The holder according to claim 1 wherein said flange means are disposed in the same plane as said backing member.

4. The holder according to claim 1 further including handle means disposed on the top of said backing member.

5. A holder for electronic circuit boards, said holder being adapted to be disposed in a telephone network interface device, said holder comprising:
   a backing member adapted to serve as a central support for said holder, said backing member having a face portion and two ends; and
   a pair of channel members disposed on face portion of said backing member, the interiors of said channel members being spaced from and opposing each other in a face to face relation; and
   bottom wall means disposed on the face portion of said backing member, said bottom wall means connecting said channel members and said backing member, whereby pocket means for the disposition of a circuit board is formed; and
   laterally extending flange means disposed on each of the two ends of said backing member, said flange means allowing said holder to be disposed in slots in said telephone network interface device; and
   at least one hollow pillar means disposed between one of the said flange means and said backing member, said pillar means being hollow so as to receive electrical connection means.

6. The holder according to claim 5, wherein there are at least two pillar means, said pillar means being disposed in the same plane as the backing member.

7. The holder according to claim 5 wherein there are at least four pillar means, two of said pillar means being disposed at each end of said backing member, and means in said pillar means to receive a fastener for attaching wires.

8. The holder according to claim 7 wherein at least one pillar means is disposed in a plane with said backing member and at least one other pillar means is disposed in front of said pillar means aforesaid.

9. The holder according to claim 5 wherein there are at least three pillar means, two of which are at one end of said backing member; and separator means disposed between two adjacent pillar means means whereby to prevent electrical contact between electrical terminal posts.

10. The holder according to claims 1 or 5 wherein there are two sets of channel members and associated bottom wall means, each set being disposed on opposite faces of said backing member in a back to back relationship whereby two circuit boards can be stored on a single holder.

* * * * *